(12) United States Patent
Mougin et al.

(10) Patent No.: US 8,485,342 B2
(45) Date of Patent: Jul. 16, 2013

(54) METHOD FOR GROUPING VIALS, BOTTLES OR SAME

(75) Inventors: Didier Mougin, Octeville-sur-Mer (FR);
Michel Begin, Octeville-sur-Mer (FR);
Guillaume Duchemin,
Octeville-sur-Mer (FR); Christophe Poupon, Octeville-sur-Mer (FR)

(73) Assignee: Sidel Participations, Octeville sur-Mer (FR)

( * ) Notice: Subject to any disclaimer, the term of this patent is extended or adjusted under 35 U.S.C. 154(b) by 173 days.

(21) Appl. No.: 12/667,502

(22) PCT Filed: Jun. 16, 2008

(86) PCT No.: PCT/FR2008/051075
§ 371 (c)(1),
(2), (4) Date: Dec. 31, 2009

(87) PCT Pub. No.: WO2009/004241
PCT Pub. Date: Jan. 8, 2009

(65) Prior Publication Data
US 2010/0193326 A1 Aug. 5, 2010

(30) Foreign Application Priority Data
Jul. 4, 2007 (FR) ................................. 07 04807

(51) Int. Cl.
*B65B 47/08* (2006.01)
(52) U.S. Cl.
USPC ........ 198/426; 198/418.5; 198/429; 198/430; 198/370.07; 198/456

(58) Field of Classification Search
None
See application file for complete search history.

(56) References Cited

U.S. PATENT DOCUMENTS

| | | | | |
|---|---|---|---|---|
| 5,117,965 A | * | 6/1992 | Newell et al. | 198/444 |
| 5,429,651 A | * | 7/1995 | Bolin | 65/241 |
| 6,164,045 A | * | 12/2000 | Focke et al. | 53/543 |

FOREIGN PATENT DOCUMENTS
GB 2 174 667 A 11/1986

\* cited by examiner

*Primary Examiner* — Kavel Singh
(74) *Attorney, Agent, or Firm* — Sughrue Mion, PLLC

(57) ABSTRACT

The invention relates to a method for collecting products (2) arriving in line on a conveyor (1), using a collector device (4) provided transversally relative to the advancement direction. The collector (4) deposits and drops the products collected at a take-up station (10) located on the side of said supply conveyor (1) the collector (4) is capable of a loop movement that can divided into a transverse movement combined with a longitudinal movement upwards of the queue, i.e. a movement opposite to that of the product supply conveyor. The equipment for implementing the method includes a table (3) provided at and along the conveyor (1), a collector (4) carried by an appropriate structure for longitudinal and transverse movement above said conveyor (1) and said table (3). The table (3) includes two panels (31, 32) extending on either side of the supply conveyor (1) for depositing and dropping the products collected on either side of the conveyor (1) at the edge thereof.

11 Claims, 2 Drawing Sheets

METHOD FOR GROUPING VIALS, BOTTLES OR SAME

The present invention relates to a method for grouping products for the boxing thereof for example, it also relates to the installation enabling the method to be implemented.

The grouping of products such as vials, bottles and the like can be performed in a number of ways according to the type and nature of the products as well as according to the desired rate.

One form of grouping is described in document GB 2174667. The products arrive in line on a supply conveyor and are taken up, on the fly, by a pushing device that carries a batch of bottles.

This pushing device is in the form of a rack, which is arranged longitudinally, one the side of said line of bottles. This rack is driven by a combined loop movement: both a longitudinal movement in the forward direction of the products and a transverse movement, in order to deposit the batch of products in row on the side of the supply conveyor where they are then taken up by other means.

In general, when the products arrive at the level of the take-up device, they are regularly distributed according to the pitch of the teeth or the like. The arrangement of products according to a pitch can be performed by means of a rate regulator.

For products having specific shapes, other than cylindrical shapes, for example, the orientation and the arrangement of the products according to a specific pitch are performed by means of a rate regulator, which consists of a pair of worm gears; these worm gears are used upstream of the batch take-up device, between the product preparation machine, of which the rate is relatively random, and the device in question which will bring said batch to the handling head for boxing, for example.

This take-up device cannot encounter any disorder with regard to the distribution of products. The batch of products must be perfectly established in order to be taken up by the pushing device or the like, before being picked up by the handling head which performs the boxing, for example.

When the installation is of the flexible type, i.e. capable of processing a plurality of product types, it is necessary to provide an instrument for each type of product, both at the level of the take-up device and at the level of the rate regulator gears.

The pushing-type take-up devices, or the like, generally consist of a simple blade or band made of a thermoplastic material on which leveling teeth or cells are provided; they are relatively simple to change and inexpensive.

However, this problem of changing is different for the gears of the rate regulator, which are very expensive, relatively heavy and rather complicated instruments to change.

In consideration of the weight of these gears, their changing involves an operation that may require handling materials and their storage requires store-type accommodations, which are relatively large.

Moreover, this type of installation comprising, on the one hand, a rate regulator and, on the other hand, a batch take-up device takes up a particularly long space, and can in some cases be unsuitable due to constraints associated with the layout, in particular when there is insufficient space on the existing premises.

The invention proposes a method for grouping products that enables a compact, relatively simple, and in particular highly versatile and flexible installation to be used.

This method and the installation for implementation thereof also enable the use of a very simple instrument, which is easy to change and in particular inexpensive, to be envisaged, thereby enabling instruments suitable for each type of product to be produced.

Moreover, this method enables the length of the circuit over which the products travel to be shortened, and therefore the risks of alteration of the latter by friction, in particular, on guides and the like to be reduced.

The installation is positioned directly at the outlet of the product preparation unit, after the filler and/or the labeler, for example.

It can also be in the form of an accessory and be used only for specific jobs, for certain types of products; the rest of the time it can be deactivated and bypassed.

The method enables good flexibility of use; the products can also be grouped in a single batch or a plurality of batches, as needed. The grouping method according to the invention enables a batch of products to be formed in order to be taken up by suitable means, wherein said products arrive in a line, transported by a supply conveyor; the method consists of:

collecting a certain number of products on said supply conveyor, by means of a collection device, called a collector, in the form of a comb, which is arranged transversally with respect to the forward direction of said products, depositing them and releasing them at a take-up station that is located on the side of said supply conveyor, driving said collector in a loop movement, which involves a transverse movement, sometimes combined with a longitudinal movement upstream along the product line, i.e. a movement opposite that of said product supply conveyor, activating the collection of products according to information taking into account: —the position of said products on said supply conveyor with respect to said collector, and, —the speed of said supply conveyor.

Also according to the invention, the product grouping method consists of: —detecting the arrival of a product upstream of the collector, —possibly waiting for it, and, at the very least, marking a stopping time at the moment said detected product reaches its position and is wedged in the allocated cell of said collector, then —activating the combination of transverse and longitudinal movements in order to prepare for the next collection.

According to another provision of the invention, the method consists of collecting the products one after another at various points on the supply conveyor, wherein said points are offset along the line with the same interval between two consecutive points.

Also according to the invention, the method consists, when the collector is completely filled, of —transversally offsetting it with the collected products in order to bring the latter to the deposition station, in a receiving structure also of the comb type, for example, then —moving said collector, parallel and transversally to the product supply conveyor in order, first, to overtake the line of products to be collected and, then, to return said collector to the level of the first capture point.

According to another provision of the invention, the method consists of depositing the products collected by the collector on a single side of the supply conveyor, upstream of the last collection point of said products.

According to an alternative embodiment of the invention, the method consists of depositing the products collected by the collector, alternately on one side then on the other side of the supply conveyor.

The invention also relates to the installation enabling the method detailed above to be implemented, which installation includes:

at least one table acting as a bed, arranged at the level and to the side of the conveyor for supplying the products to be collected, in order to hold the collected products, a collection device or collector, in the form of a comb, arranged transversally with respect to the forward direction of the products, capable of moving above said bed, a suitable structure for moving said collector longitudinally and transversally with respect to said supply conveyor, means for detecting the presence of a product to be collected on said supply conveyor, which means are arranged upstream of said collector and move longitudinally, simultaneously to the latter.

Also according to the invention, the table for receiving the collected products extends on either side of the supply conveyor in order to enable the collected products to be released on both sides of said conveyor, at the edge.

The invention also relates to the collector used and in particular to a collector of which the shape of each cell corresponds strictly to that of the product to be collected so as to avoid friction and limit, in the case of high speeds, the risk of the product bouncing on said collector when said product is placed in its cell.

Also according to the invention, the installation can comprise additional means that help to hold the products at the level of the take-up station, wherein said means consist of another structure, in the form of a stationary comb.

According to another provision of the invention, the installation can also comprise additional means for ensuring a certain stabilization of the products collected during the collection operation, wherein said means can, for example, consist of suction cups arranged in the base of the cells and implemented during said operation, or of a guide that can be retracted when the products are brought to the take-up station.

However, the invention will be described in greater detail below with the appended drawings, provided for illustrative purposes, in which.

Figure 1:
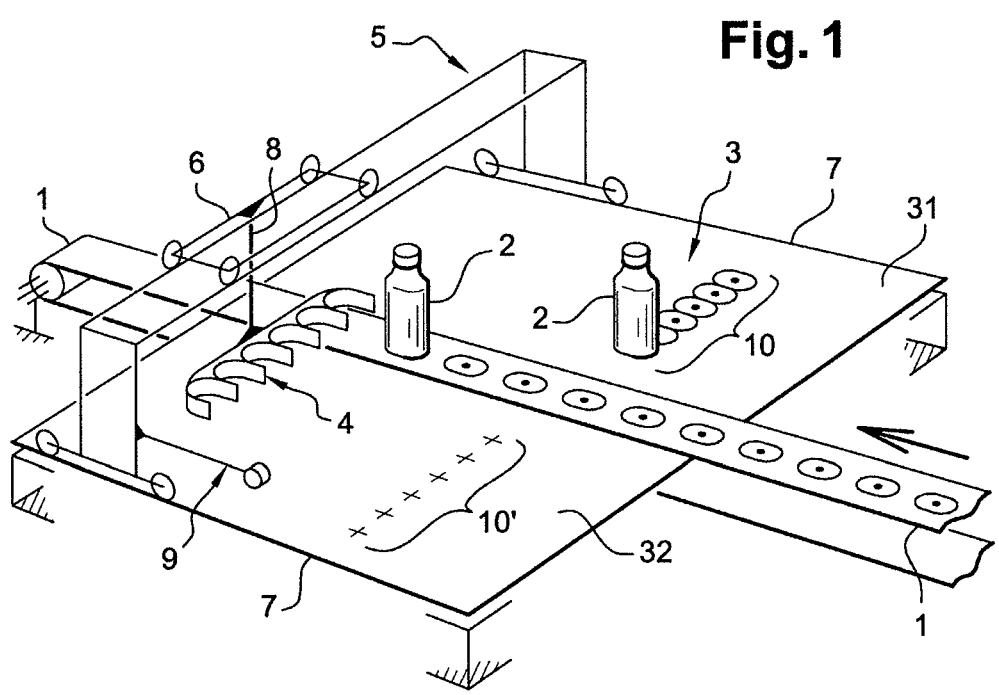
FIG. 1 is a diagrammatic perspective view of the installation according to the invention, associated with a product supply conveyor.

As shown in FIG. 1, the installation includes a conveyor 1 for supplying products 2 that come, for example, from a preparation machine, not shown, such as a filler and/or a labeler.

The products arrive in a line; they pass along a table 3, which acts as a bed; this table 3 can comprise a panel that extends along the conveyor 1, at exactly the same level; it can also, as shown in FIG. 1 and explained below, consist of two panels 31 and 32, which extend on either side of the conveyor 1, forming a continuous surface; each panel 31, 32 is at the same level as the upper surface of said conveyor 1.

The supply conveyor 1 is discharged of its products 2 by means of a collection device called a collector in the text, wherein said collector 4, in the form of a comb, collects the products 2 one after another as said conveyor 1 advances; it is arranged transversally with respect to the forward direction of said products 2 and it is offset transversally, after each collection, by a distance on the order of the width of said products 2.

To be capable of discharging the collected products and beginning a new cycle, the collector 4, as detailed below, is also capable of moving longitudinally. It moves upstream along the line of products in the direction opposite the forward movement of the supply conveyor 1 during the collection operation and, then, after depositing and releasing the collected products, said collector again moves along the product line, but in the forward direction of said conveyor this time, and at a high speed, in order to overtake said line and quickly be repositioned in front of the first product to be collected.

To perform these different movements, the collector 4 is mobile, borne and guided by a structure that includes: —a sort of portal 5 capable of moving longitudinally above the table 3, in the same direction as the products 2 arranged on the conveyor 1, and, —a carriage 6, which moves on said portal 5, always above said table 3, transversally; said collector 4 is suspended to said carriage 6.

The portal 5 is guided on rails 7 arranged on the table 3 and in particular on the lateral edges of each panel 31, 32, and it is mobile under the effect of a drive member, not shown, of the servo reducer or linear motor type.

The carriage 6 is guided on beams arranged at the upper portion of the portal 5 and it is also mobile under the effect of a drive member, not shown, of the servo reducer or linear motor type.

The collector 4 is secured to the carriage 6 by means of a support in the form of an arm 8; it is held at a suitable height with respect to the products 2 to be collected.

The connection between the arm 8 and the collector 4 is arranged so as to facilitate the model changing operations; this collector is indeed an instrument that is adapted to the shape of the products 2 to be collected.

A detection system 9 installed on the portal 5 enables the product 2 collection cycle to be started. Indeed, the information concerning the detection of the passage of a product enables, according to the forward speed of the supply conveyor 1, the time of its integration in the allocated cell of the collector 4 to be determined by means of a suitable calculator.

After this integration, the collector 4 can activate its off-setting movement and position the free adjacent cell on the axis of the line of products arranged on the supply conveyor 1, so that said cell is ready to collect the next product.

When the given number of products 2 to be collected has been reached, said collected products are directed and released at the take-up station 10, which is located on the table 3, in the upstream portion.

According to the type of products, the arm 8 can comprise a plurality of superimposed collectors, two for example, for products of which the height is such that they risk, due to their instability, causing incidents when they are taken up by a single collector 4.

The products 2 arrive in a line on the supply conveyor. They are preferably spaced apart either naturally at the outlet of the preparation machine or in a forced manner by suitable means, not shown.

Figure 2:
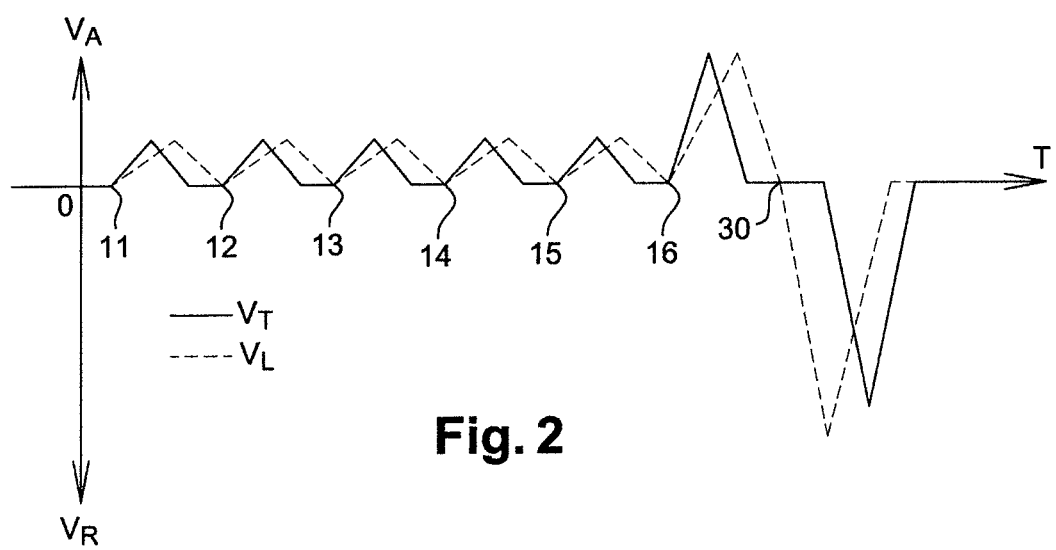
FIG. 2 is a time chart with the time T on the x-axis and the going VA and returning VR speeds on the Y axis, which time chart shows a product collection cycle with the collector movement rate curves: a solid-line curve for the transverse speed VT and a dotted-line curve for the longitudinal speed VL.

FIG. 2 shows, in the form of a time chart, the going VA and returning VR speeds of transverse movement of the collector 4, as a function of time T.

The time chart shows a complete cycle of collection of six products 2 with deposition at the take-up station 10 and return to the level of the first collection point.

These different collection points appear in the time chart of FIG. 2 as well as in the subsequent figures.

Figure 3:
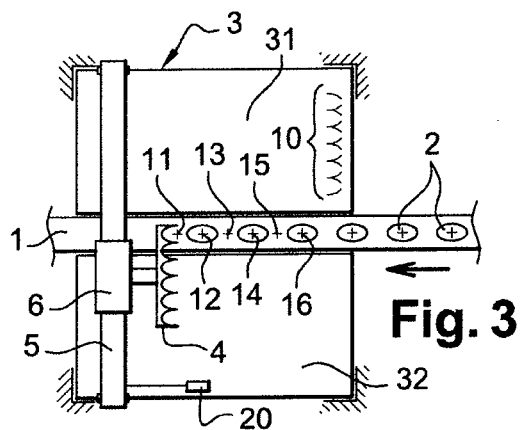
FIGS. 3 to 8 show some steps of the product collection method.

The first reference point 11 in the time chart corresponds to the time at which, as shown in FIG. 3, the collector 4 receives the first product 2, 21, which arrives with the conveyor 1.

Before this point 11, the collector 4 is in the waiting position, immobile, ready to receive the first product 2, 21.

This first product 21 is detected by the suitable system 9 consisting of a cell 20, which is shown in this FIG. 3 and in the subsequent figures. This cell 20 is longitudinally borne by the collector 4; it precedes the latter.

Once the first product 21 has been positioned in its cell of the collector 4 and owing to the information provided by the cell 20, said collector 4 moves, as indicated in the time chart, with a specific movement that first comprises a combination of movements including a transverse component and a longitudinal component, then the transverse component stops while the longitudinal movement continues, until the moment of impact.

The duration of the transverse movement is therefore slightly shorter than that of the longitudinal movement.

This combination of movements is not permanent; it is only temporary and it enables the collector 4 to have time to become stabilized in the transverse direction, before collecting the product 2 that presents itself to it.

Figure 4:
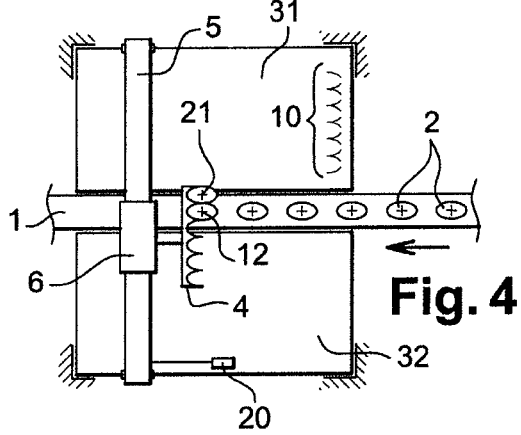

The transverse movement of the collector 4 is stopped once the second cell reaches the axis of the product line 2 and said collector 4 waits for the impact of the second product 22 to be collected. This new impact takes place at a second point 12, which is also stationary, wherein said second point 12, shown in FIG. 4, is located upstream of the first collection point 11.

The distance between the two collection points is dependent on a plurality of parameters, such as, for example, the maximum acceleration and maximum speed capacities of the collector 4 combined with the special properties of the products in terms of stability, shape and size.

In the embodiment shown in the figures, this distance is on the order of half the pitch that exists between two consecutive products 2 arranged on the conveyor 1.

At the time of impact of the product 2, 21 with the collector 4, the speed of the product collected corresponds to the speed of the supply conveyor 1, and, at this precise instant, said collector 4 is immobile.

The collection of the other products 23 to 26 is therefore carried out step-by-step, as above, each time with a new stationary collection point that is at a distance from the preceding point.

Figure 5:
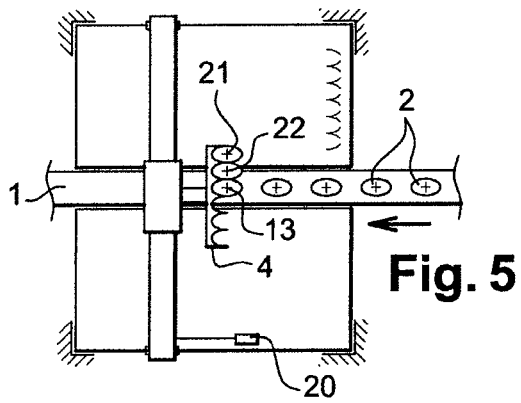
Figure 6:
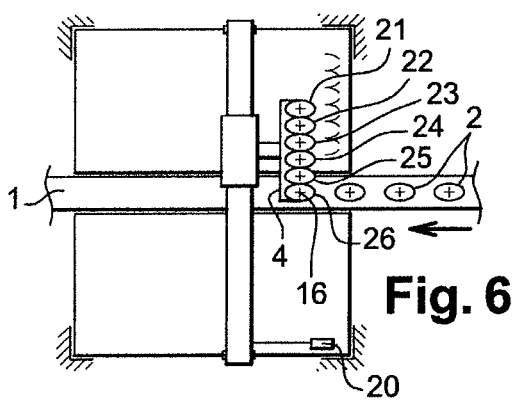

As shown in FIG. 5 as well as in the time chart of FIG. 2, the next collection points are point 13, then points 14, 15 also shown in said time chart, and, finally, point 16, FIG. 6, where the collector 4 receives the last product 26 of the batch.

Figure 7:
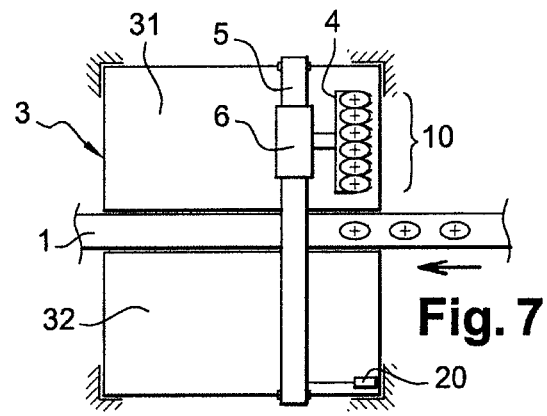

The collector 4 then quickly and totally moves out to the side of the conveyor 1, as shown in FIG. 7 and in the time chart, in order to deposit and release its batch of products at the take-up station 10; this deposition is referenced 30 in said time chart.

This take-up station 10 can comprise, as shown in the figures, a stationary comb-type structure, for receiving the batch of products 21 to 26, in order to stabilize them and hold them until they are taken up by a handling head, for example, not shown, or the like.

Figure 8:
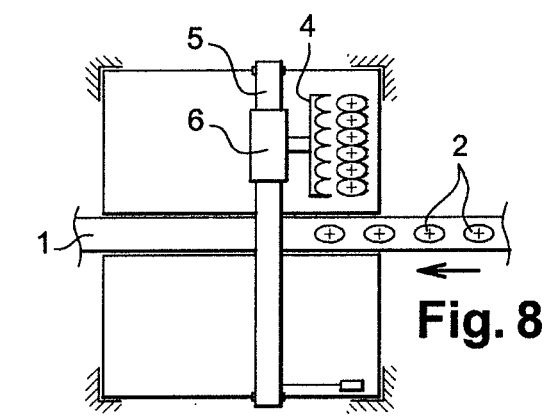

Once the batch of products 21 to 26 is at the take-up station 10, on the panel 31 of the table 3, the collector 4 is driven by a backward movement, FIG. 8; this movement is performed parallel to the line of products 2 arranged on the supply conveyor 1, at a speed greater than that of said conveyor 1, in order to overtake said line and enable the collector 4 to be repositioned by a translation movement, at the first collection point 11, as shown in FIG. 3, before beginning another collection cycle.

This cyclic movement, in a loop, has a duration that is determined by the speed of movement of the products 2 that are carried by the conveyor 1, but in particular by the time taken by each product to reach its collection point, and this time may vary according to the spacing between said products.

Once the actual collection operation has been completed, the cell 20 is put in standby mode; it is in particular inactive during the backward movement of the collector 4.

Figure 9:
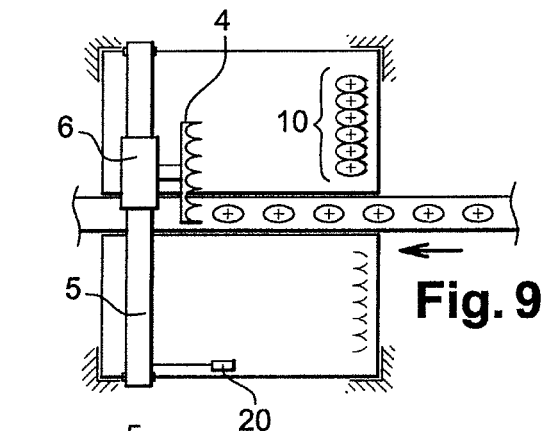
FIGS. 9 and 10 show an alternative of the installation that is equipped with two areas for release of the collected products.
Figure 10:
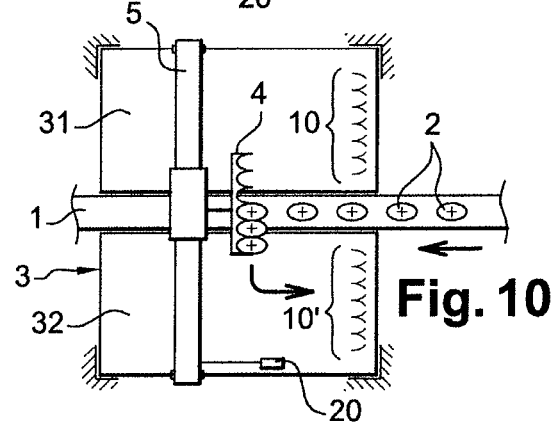

FIG. 9 shows an alternative embodiment of the installation.

This installation comprises a table 3, as indicated above, which is totally symmetrical with respect to the supply conveyor 1. This symmetry enables two take-up stations 10 and 10' to be arranged on the table 3:
- the station 10 located on the panel 31, at the right-hand edge of said conveyor 1 and
- the station 10' located on the panel 32, at the left-hand edge of said conveyor 1.

Each batch of collected products 2 is deposited and released alternately on the sides of the conveyor 1 at the edge, by the same collector 4.

This arrangement confers a movement on the collector 4 of which the envelope is a loop with a contour having the shape of deployed butterfly wings. This movement of the collector 4 with going and return trips between the two stations 10, 10' enables the idle time to be limited.

FIG. 9 shows the collector 4 in the waiting position at the first collection point 11 after its return from the deposition station 10. The collection is performed as described above, but the collector 4 progresses towards the second take-up station 10'.

During this collection and deposition cycle on the left-hand edge of the conveyor 1, the batch of products deposited at the station 10 of the right-hand edge of said conveyor is removed, freeing space for the arrival of a new batch of products 2.

The collector 4 can also comprise cells capable of receiving a plurality of products 2.

During the loading of the collector 4, suitable means can hold the products collected in the cells. These means are longitudinally borne by the collector 4. They can consist of suction cups placed in the base of the cells of the collector 4 and which are implemented during the collection operation, or guide-type means, wherein the guide can be retracted when the collector arrives at the take-up station 10 or 10'.

The invention claimed is:

1. A method for grouping products so as to form a batch in order to be taken up by a suitable mechanism, wherein said products arrive in a line, transported by a supply conveyor; the method comprising steps of:
   providing a movable comb-like collector, which comprises a certain number of cells, said number of cells being two or more,
   collecting a certain number of products on said supply conveyor, by said collector, which is arranged transversally with respect to a forward direction of said products, each of said products collected individually in one of said cells,
   depositing and releasing said number of products at a take-up station that is located on a side of said supply conveyor,
   driving said collector in a loop movement, which involves a transverse movement of said collector, sometimes combined with a longitudinal movement of said collector upstream along said product line, opposite the movement of said product supply conveyor, activating the collection of products according to information taking into account the position of said products on said supply conveyor with respect to said collector, and the speed of said supply conveyor; and for said collector, after having detected an arrival of a first product to be collected, marking a stopping time at the moment that said first product reaches a position and is wedged in an allocated cell of said cells of the collector, then activating the combination of transverse and longitudinal movements in order to prepare for a next collection, stopping the transverse movement and longitudinal movement of said collector at the moment of impact; and collecting said products one after another at various points on said supply conveyor, wherein said points are offset along said line with a same interval between two consecutive points; and when said collector is completely filled, transversally offsetting said collector with the collected products in order to bring said collected products to a deposition station, in a receiving structure also of the comb type, then moving said collector, parallel to said product supply conveyor in order, first, to overtake said line of products and said first product to be collected and, then, longitudinally and transversally to return said collector to the level of a first capture point.

2. The method for grouping products according to claim 1, comprising depositing said products collected by said collector on a single side of said supply conveyor, upstream of a last collection point of said products.

3. The method for grouping products according to claim 2, comprising depositing said products collected by said collector, alternately on the right-hand edge and then on the left-hand edge of said supply conveyor.

4. A method for grouping products so as to form a batch in order to be taken up, the method comprising:

providing a movable comb-like collector, which comprises at least two cells, each cell configure to receive a product;

transporting the products in a line on a supply conveyor;

collecting products that have been transported in the line in the collector, the collector arranged transversally with respect to a direction of transporting the products in the line on the supply conveyor, each of the products collected individually in a respective one of the cells;

depositing and releasing the products collected in the collector at a take-up station;

driving the collector in a direction both transverse to and parallel to the direction of transporting the products in the line on the supply conveyor, the collector being driven in a direction parallel to the direction of transporting the products in the line when the collector is shifted laterally with respect to the line.

5. The method for grouping products according to claim 4, further comprising activating the collection of products according to information, taking into account the position of the products on the supply conveyor with respect to the collector and the speed of the supply conveyor.

6. The method for grouping products according to claim 4, wherein the step of driving the collector comprises driving the collector in loop movement, which comprises the transverse movement combined with the parallel movement.

7. The method for grouping products according to claim 4, wherein the comb-like collector comprises three or more cells, each cell configure to receive a product.

8. The method for grouping products according to claim 4, wherein the cells of the collector define a row of cells, said row extending transversally with respect to the direction of transporting the products in the line on the supply conveyor.

9. The method for grouping products according to claim 4, wherein the take-up station is located on a side of the supply conveyor.

10. The method for grouping products according to claim 4, further comprising longitudinally moving the collector when the collector is displaced from the take-up station to a collecting position for collecting the products that have been transported in the line, the collector being longitudinally moved parallel to the direction of transporting the products in the line on the supply conveyor.

11. The method for grouping products according to claim 10, wherein said line is displaced with a first speed and said collector is displaced with a second speed, the second speed being higher than the first speed when the collector is displaced from the take-up station to the collecting position.

* * * * *